Jan. 28, 1930.  A. A. CONWAY  1,745,079
FRICTION CLUTCH
Filed April 7, 1926   2 Sheets-Sheet 1

Inventor
ALFRED A. CONWAY,
By Murray and Gugelta
Attorneys

Jan. 28, 1930.  A. A. CONWAY  1,745,079
FRICTION CLUTCH
Filed April 7, 1926  2 Sheets-Sheet 2

Inventor
ALFRED A. CONWAY,
By Murray & Zugelter
Attorneys.

Patented Jan. 28, 1930

1,745,079

UNITED STATES PATENT OFFICE

ALFRED A. CONWAY, OF CINCINNATI, OHIO

FRICTION CLUTCH

Application filed April 7, 1926. Serial No. 100,419. REISSUED

This invention relates to improvements in friction clutches.

An object of my invention is to provide a device wherein centrifugal force assists in releasing the clutch.

Another object of my invention is to provide a device of this kind requiring a minimum of effort to manufacture and assemble and wherein a maximum of efficiency is obtained.

These and other objects are attained by the means described herein and disclosed in the accompanying drawing, in which.

Figure 1:
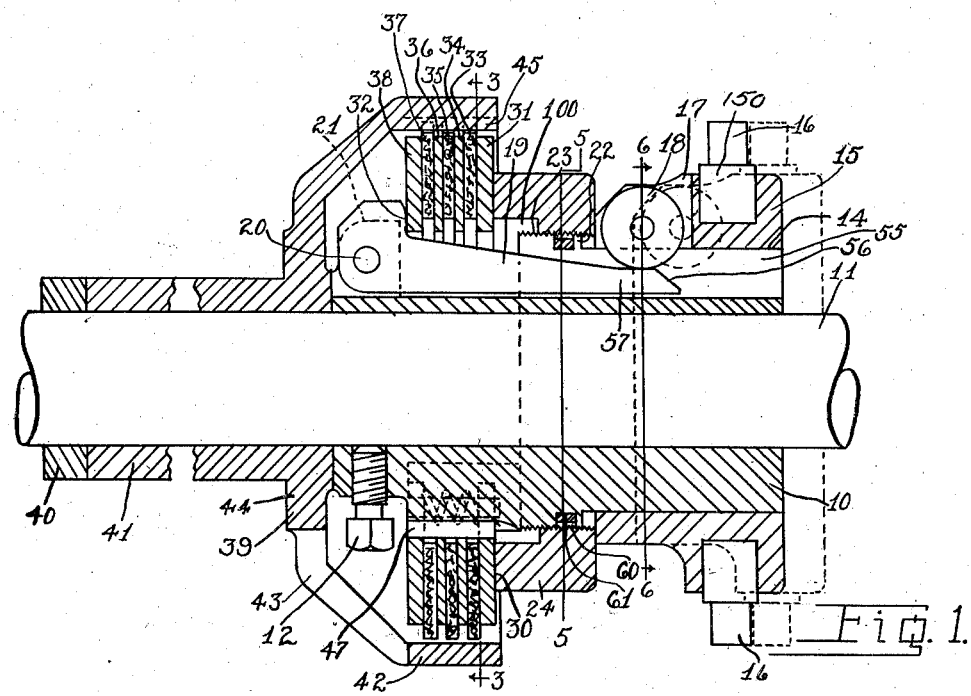
Fig. 1, is a sectional view of a clutch of my invention.
Figure 2:
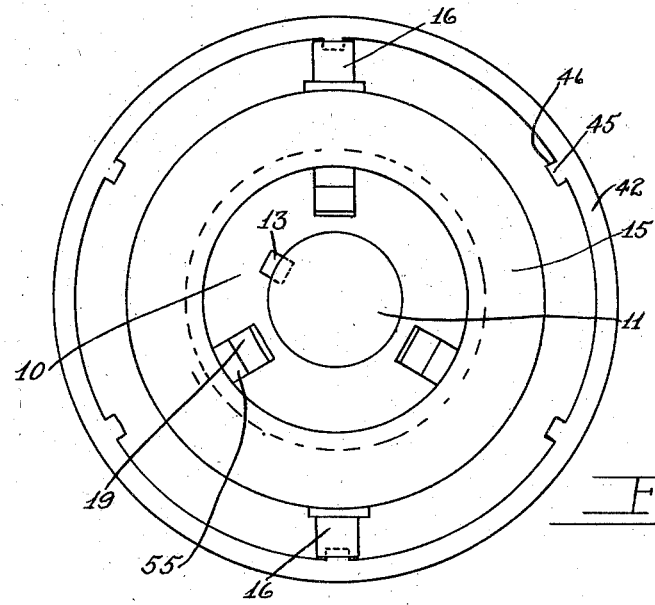
Fig. 2, is an elevation of the device shown in Fig. 1.
Figure 3:
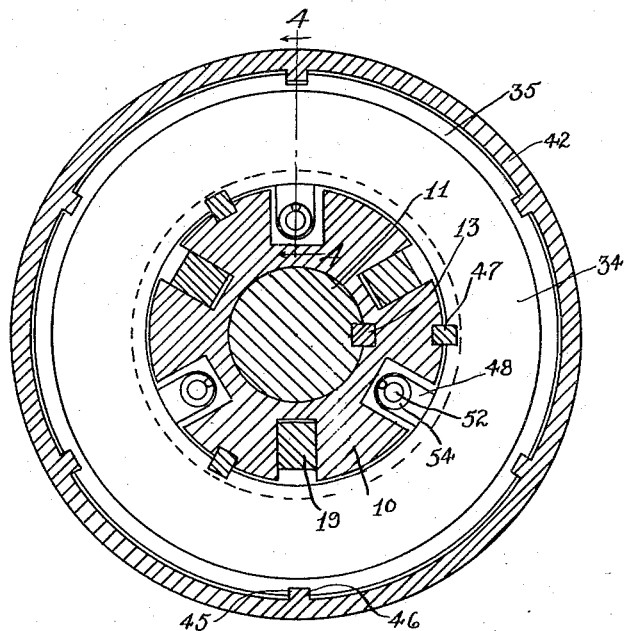
Fig. 3, is a sectional view taken on line 3—3 of Fig. 1.
Figure 4:
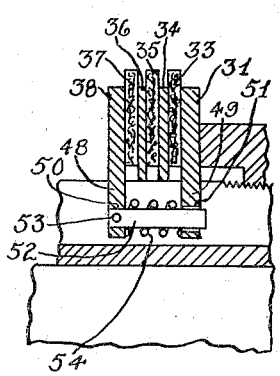
Fig. 4, is a sectional view taken on line 4—4 of Fig. 3.

The device of my invention comprises a hub or carrier 10 secured to a revoluble shaft 11 by means of a set screw 12 and key 13. The hub 10 may be secured to the shaft 11 in any other manner. The hub 10 is provided with a bearing 14 upon which a collar 15 may be slidably actuated. The shifting ring 150, seated for free relative movement in a suitable groove in the collar 15 is provided with lugs 16 to which any conventional actuating device may be secured. The collar 15 is provided with spaced lugs 17 between which are revolubly mounted rollers 18 which contact pawls 19. The pawls 19 are pivotally mounted at 20 between pairs of lugs 21 provided on the forward end of the hub 10.

Figure 5:
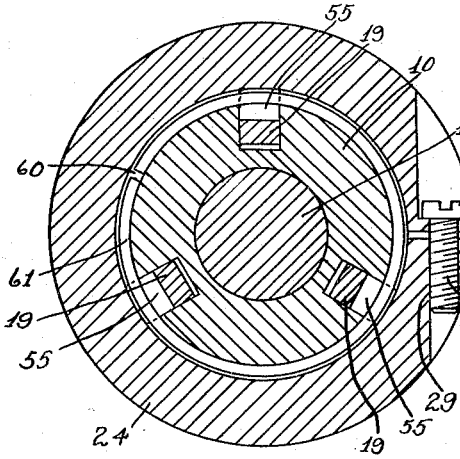
Fig. 5, is a sectional view taken on line 5—5 of Fig. 1.
Figure 6:
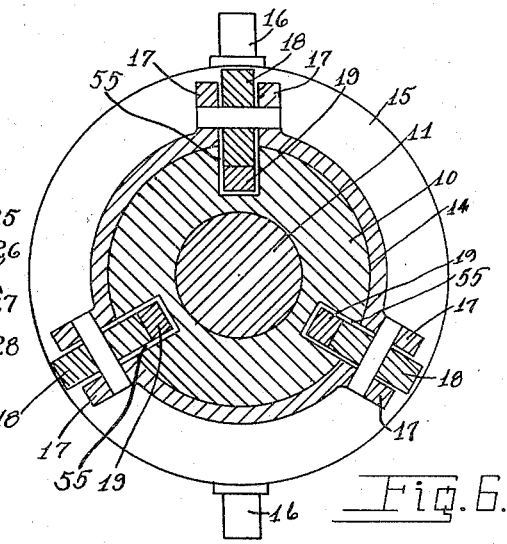
Fig. 6, is a sectional view taken on line 6—6 of Fig. 1.

The hub 10 is provided with an enlarged portion or collar 22 having screw threads 23 formed thereon. A split nut 24 shown in Fig. 5 is threadedly secured on the collar 22. The nut 24 may be adjusted longitudinally of the collar 22 and locked in adjusted position by means of a cap screw 25 extending through the lug 26 formed on the nut 24 adjacent the split 27 therein. The threaded portion 28 of the cap screw 25 extends into a threaded bore 29 formed in the nut 24 in alignment with the perforation formed in the lug 26. The forward end 30 of the nut 24 contacts the outer friction disk 31 of a plurality of disks placed intermediate the shoulders 32, formed on the pawls 19, and the nut 24. It should be noted that the carrier member 10 is provided with a peripheral groove 60 in which a bumper ring 61 is secured. The bumper ring is used to stop the outward throw of the pawls 19 to prevent said pawls from striking and damaging the threads of the nut 24.

Intermediate the shoulders 32 of the pawls 19 and the nut 24 are a series of friction disks 31, 33, 34, 35, 36, 37 and 38. The disks 31, 34, 36 and 38 are of a material having a high coefficient of friction with the disks 33, 35 and 37. All of the disks may be made of metal, or alternate disks may be of metal and some friction material such as raybestos and the like.

Adjacent to and contacting the hub 10 is the driven member 39 retained in position by a collar 40 or the like, the driven member having formed thereon a sleeve 41 upon which may be secured a pulley, gear, sprocket, etc., not shown in the drawing. The driven member 39 is provided with an annular ring 42 connected with the sleeve 41 by means of arms 43 having their opposite ends integral with the flange 44 which extends from the sleeve 41 and the ring 42. The annular ring 42 extends beyond the innermost friction disk 31 as shown in Fig. 1. The annular ring 42 is provided on its inner face with a plurality of keys 45 which seat in key ways 46 formed at intervals around the circumferential edge of the disks 33, 35 and 37. It is therefore evident that rotation of the disks 33, 35 and 37 will cause a rotation of the driven member 39 and sleeve 41.

The hub 10 is provided with a plurality of keys 47 intermediate the collar 22 and the lugs 21. The keys 47 are received in key ways formed in the inner bore of the disks 31, 34, 36, and 38. It should be noted that rotation or movement of the hub 10 causes a similar rotation or movement of the friction disks 31, 34, 36 and 38.

The friction disks 38 and 31 are provided with ears or lugs 48 and 49 extending interiorly from the bore thereof. The ears 48 and 49 are provided with aligned perforations 50 and 51. A guide post 52 is secured at 53 in the perforation 50 formed in the ear 48. The other end of the post 52 is slidably actuated through the perforation 51 formed in the ear 49. An expansion spring 54 is mounted about the guide post 52 and has its opposite ends in abutment upon the ears 48 and 49 yieldably tending to separate the friction disks one from the other.

The hub 10 is provided with ways 55 in which the pawls 19 are positioned. The pawls 19 are provided with a cam face or shoulder 32 at one end and a tapered or inclined face 56 at their opposite ends. It should be noted that with this structure the pawls are concealed from view and are actuated within the body lines of the carrier member 10. This structure insures safety when this type of friction clutch is employed and requires a minimum of space.

The operation of my device is as follows: Power is applied to the shaft 11 causing same to be rotated whereby the hub 10 is also rotated through the set screw 12 and key 13. The collar 15 is now slidably actuated toward the driven member whereby the rollers 18 carried by the collar 15 contact the inclined faces 56 of the pawls 19 thereby rotatably actuating the pawls about their pivots 20. The actuation of the pawls 19 about their pivots causes the cam faces or shoulders 32 thereof to compress the friction rings and clamp same between the shoulders and the inner face 30 of the nut 24. The friction disks 31, 34, 36 and 38 are actuated by the hub 10 through the keys 47. The frictional contact between the disks 31, 34, 36 and 38 and the friction disks 33, 35 and 37 causes the actuation or rotation of said friction disks thereby rotating the driven member through the keys 45 formed thereon, whereby motion or power may be transmitted to a pulley or the like that may be secured to the sleeve 41 of the driven member 39.

When it is desired to stop the driven member 39 the collar 15 is shifted to the right, see Fig. 1, to the position shown in dotted lines whereby the rollers 18 are free of the pawls 19.

Upon the withdrawal of the collar 15 the continued rotation of the hub 10, through centrifugal force, throws the outer ends 57 of the pawls 19 away from their centers about the pivots 20 whereby the cam faces or shoulders 32 are freed from the disk 38. When the contact is broken between the cam faces or shoulders 32 and the disk 38 the springs 54 separate the friction disks, breaking the driving connection between them, and removing the power from the driven member 39.

The wear that may develop between the disks may be taken up by tightening the adjusting nut 24. It should be noted that I have provided a recess 100 interiorly of the nut 24, adjacent the bearing face 30 thereof, which enables the nut to clear the keys 47 secured in the hub 10.

What I claim is:

1. A clutch comprising a hollow driven member, a driving member having a recess extending longitudinally thereof and received in the hollow in the driven member, complementary normally disengaged means carried by the driving member and driven member within the hollow of the driven member for transmitting motion when clamped upon one another from the drive to the driven member, a pawl having a long and a short arm pivotally carried by the driving member, the pawl being pivoted at the junction of the arms and having the longer arm disposed within the recess in the driving member, and the short arm disposed on one side of the complementary normally disengaged means, an abutment carried by the driving member and disposed on the opposite side of the complementary normally disengaged means to that on which the short arm of the pawl is disposed, and means operable on the long arm of the pawl for actuating said long arm centerward of the driving member about the pivotal mounting of the pawl for clamping the complementary normally disengaged means upon one another between the short arm of the pawl and the abutment.

2. A clutch comprising a drive member and a driven member mounted for rotatory movement, an abutment carried by one of said members, complementary normally disengaged means carried by the drive member and driven member for movement into driving engagement with one another for transmitting movement between the drive member and the driven member, a pawl pivotally mounted on the member carrying the said abutment, the pawl having a pair of divergent arms, one arm adapted to operate upon the complementary normally disengaged means and the second arm disposed centerward of said complementary means and extending toward and beyond said abutment, and means for moving said second arm centerward about the pivotal mounting of said pawl for clamping said complementary means between the first arm of the pawl and the abutment.

3. A clutch comprising a drive member and a driven member, an abutment carried by one of said members, friction disks carried by the drive member and the driven member normally out of driving contact with one another and adapted to be clamped upon one another to effect unitary movement of the drive member and the driven member, means for clamping the friction disks against said abutment and comprising a pawl having a pivotal connection and mounted for rotatory movement with said abutment, said pawl having its pivotal mounting on one side of the friction disks and comprising an arm extending below and beyond the friction disks and abutment, and means for engaging the pawl arm and actuating same in a direction away from the friction disks for clamping the friction disks between the pawl and the abutment.

4. A clutch comprising a recessed transmission member, a second transmission member having a recessed portion projecting into the recess in the first member, a pawl within the recess in the second mentioned member, said pawl comprising a pair of divergent arms and having at the junction of said arms a pivotal mounting on the second mentioned member, one arm of said pawl extending radially from the recess in the second mentioned member into the recess in the first mentioned member, an actuating member, the second arm of the pawl having a free end, adapted for engagement with the actuating member for moving the pawl about its pivotal mounting, an abutment member carried by the second mentioned transmission member and disposed adjacent the free end of the second pawl arm, and complementary friction rings carried by both transmission members and disposed between the abutment and the radially extending arm of the pawl, said rings disposed radially outward from said pawl, and the said radially extending arm of the pawl adapted to clamp the friction rings against the abutment upon movement of the free end of the second pawl arm radially inward.

5. A clutch comprising a pair of complementary rotating clutch members, a set of friction rings, adjacent rings connected alternately with different rotating clutch members for unified movement with their respective clutch members, an abutment member on one clutch member for engaging the set of friction rings at one side thereof, a pivotally mounted pawl mounted on said last mentioned clutch member and having a pair of arms, one arm adapted to engage the set of friction rings and to urge them toward the abutment member, and the other pawl arm lying centerward of the friction rings and having a free end adjacent the abutment member, and means for urging the free end of said arm centerward for clamping the friction rings between the pawl and the abutment member.

6. In a clutch the combination of a driving member, a driven member, a plurality of friction disks secured to each of said members, an abutment on one of the members adjacent the disks, a pawl having a pivotal mounting on said member adjacent the disks on the side opposite the abutment, a cam on the pawl adjacent the pivotally mounted end thereof, said pawl having a free end remote from the disks, and means for moving the free end of the pawl toward the axis of the clutch for clamping the disks between the cam and the abutment.

7. In a clutch the combination of a driving member, a driven member, a plurality of friction disks secured to each of said members, an abutment on one of the members adjacent the disks, a pawl having a pivotal mounting on said member adjacent the disks on the side opposite the abutment, a cam on the pawl adjacent the pivotally mounted end thereof, said pawl having a free end remote from the disks, yielding means normally separating the disks and means for moving the free end of the pawl toward the axis of the clutch for clamping the disks between the cam and the abutment.

8. A clutch comprising a pair of complementary rotating clutch members, a group of co-operating friction rings, adjacent rings being connected alternately with the several clutch members, an abutment on one of said clutch members for engagement with one side of the group of friction rings, a pawl on said last mentioned clutch member pivotally mounted intermediate its ends, one end of the pawl adapted to engage a group of friction rings for urging the rings toward the abutment member, and means for urging the other end of said pawl centerward for clamping the friction rings between the pawl and the abutment.

In testimony whereof, I have hereunto subscribed my name this 26th day of March, 1926.

ALFRED A. CONWAY.